United States Patent
Linjama et al.

(10) Patent No.: US 11,039,234 B2
(45) Date of Patent: Jun. 15, 2021

(54) ENHANCED SOUND PERCEPTION VIA REGULATED VIBRATION

(71) Applicant: FLEXOUND SYSTEMS OY, Espoo (FI)

(72) Inventors: Jukka Linjama, Espoo (FI); Tommi Immonen, Vantaa (FI)

(73) Assignee: FLEXOUND SYSTEMS OY, Espoo (FI)

( * ) Notice: Subject to any disclaimer, the term of this patent is extended or adjusted under 35 U.S.C. 154(b) by 302 days.

(21) Appl. No.: 16/301,243

(22) PCT Filed: May 15, 2017

(86) PCT No.: PCT/EP2017/061569
§ 371 (c)(1),
(2) Date: Nov. 13, 2018

(87) PCT Pub. No.: WO2017/194784
PCT Pub. Date: Nov. 16, 2017

(65) Prior Publication Data
US 2020/0322706 A1    Oct. 8, 2020

(30) Foreign Application Priority Data

May 13, 2016    (EP) ..................... 16169568

(51) Int. Cl.
*H04R 1/02*    (2006.01)
*H04R 9/06*    (2006.01)

(52) U.S. Cl.
CPC ............... *H04R 1/028* (2013.01); *H04R 9/06* (2013.01); *H04R 2400/03* (2013.01); *H04R 2430/03* (2013.01)

(58) Field of Classification Search
CPC ...... H04R 1/028; H04R 9/06; H04R 2400/03; H04R 2430/03
See application file for complete search history.

(56) References Cited

U.S. PATENT DOCUMENTS

| | | |
|---|---|---|
| 5,684,722 A | 11/1997 | Thorner et al. |
| 8,934,643 B2 | 1/2015 | Aarts et al. |

(Continued)

FOREIGN PATENT DOCUMENTS

| | | |
|---|---|---|
| CN | 102007777 A | 4/2011 |
| WO | WO 01/41322 | 6/2001 |
| WO | WO 2015/118217 | 8/2015 |

OTHER PUBLICATIONS

Search Report issued in Chinese Patent Application No. 201780029693.3 dated Nov. 5, 2019 with English translation provided.

(Continued)

*Primary Examiner* — Brian Ensey
(74) *Attorney, Agent, or Firm* — Nixon & Vanderhye

(57) ABSTRACT

A technique for joint production of vibration and sound is provided. According to an example embodiment, the technique is provided by an apparatus including a unit for jointly producing vibration and sound to reproduce an input audio signal provided as input thereto, the unit arranged inside a padding to generate mechanical vibration that is perceivable as a vibration and sound on at least one outer surface of the padding and to radiate the sound through the at least one outer surface of the padding and a unit for regulating perceivable intensity of vibration in dependence of at least one characteristic of the input audio signal.

20 Claims, 3 Drawing Sheets

(56) References Cited

U.S. PATENT DOCUMENTS

| | | | |
|---|---|---|---|
| 9,949,004 B2* | 4/2018 | Cohen | A61H 23/0236 |
| 2007/0038164 A1 | 2/2007 | Afshar | |
| 2009/0216352 A1 | 8/2009 | Glebe et al. | |
| 2010/0320819 A1* | 12/2010 | Cohen | A61H 23/0236 |
| | | | 297/217.4 |
| 2020/0246579 A1* | 8/2020 | Cohen | A61H 23/02 |

OTHER PUBLICATIONS

International Search Report, PCTEP2017/061569, dated Jul. 18, 2017.
European Search Report, EP 16 16 9568, dated Oct. 21, 2016.

* cited by examiner

ENHANCED SOUND PERCEPTION VIA REGULATED VIBRATION

TECHNICAL FIELD

The example embodiments of the present invention relate to enhanced sound perception via vibration.

BACKGROUND

Human auditory perception takes place primarily through the ears, but it is supported by the sense of touch. At frequencies below 50 Hz, sound pressure levels above 80 dB are typically required in order to make a sound perceivable by a human listener. At such sound pressure levels, human skin starts to vibrate at perceivable levels as well, resulting in the sense of touch, i.e. the vibrotactile sense, to support hearing. At frequencies below 20 Hz (infrasonic frequencies), hearing or sensing of air pressure vibrations is solely based on vibrotactile perception. In addition to very low frequencies below 20 Hz, the frequency range of vibrotactile perception on skin typically extends up to approximately 500 Hz, while for sensitized people who may have sensory impairments with other senses it may extend even up approximately to 1000 Hz. Thus the vibrotactile sense, i.e. the sense of touch, supports human hearing in a considerable part of the perceivable audio frequency spectrum.

While a human is able to sense low frequency vibration at a lower end of the perceivable audio frequency spectrum and the infrasonic frequencies via the sense of touch, the dynamic range of the sense of touch is rather limited. In practice, low intensity vibration may be not felt at all, while on the other hand too intense vibration, especially towards the lower part of the frequency range of vibrotactile perception, is likely to cause discomfort to a human listener. This poses limitations for using the sense of touch in enhancing sound perception, especially when the vibration is transmitted to a body of the human listener via sensitive areas such as head, hands or feet. In particular, the risk of overly high perceived impact may be felt against hard surface of the skull, where excessive magnitude of vibration may even interfere with vision and sense of balance of the human listener.

SUMMARY

Therefore, an object of the present invention is provide a technique that facilitates controlling perceivable tactile impact resulting from reproduction of an audio signal such that perceivable effect via tactile sense is obtained without imposing discomfort to the listener.

According to an example embodiment, an apparatus for joint production of vibration and sound is provided, the apparatus comprising means for jointly producing vibration and sound configured to reproduce an input audio signal provided as input thereto, said means arranged inside a padding to generate mechanical vibration that is perceivable as a vibration and sound on at least one outer surface of the padding and to radiate the sound through said at least one outer surface of the padding and means for regulating perceivable intensity of vibration in dependence of at least one characteristic of the input audio signal. In an example, the means for regulating is arranged to increase magnitude of the produced vibration below a first predefined frequency point and limit intensity of the produced vibration in response to said intensity exceeding a predefined threshold.

According to another example embodiment, a method for joint production of vibration and sound is provided, the method comprising jointly producing vibration and sound to reproduce an input audio signal by using a vibration means arranged inside a padding to generate mechanical vibration that is perceivable as a vibration and sound on at least one outer surface of the padding and to radiate the sound through said at least one outer surface of the padding, and regulating perceivable intensity of vibration in dependence of at least one characteristic of the input audio signal In an example, said regulating comprises increasing magnitude of the produced vibration below a first predefined frequency point and limiting intensity of the produced vibration in response to said intensity exceeding a predefined threshold.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1A:
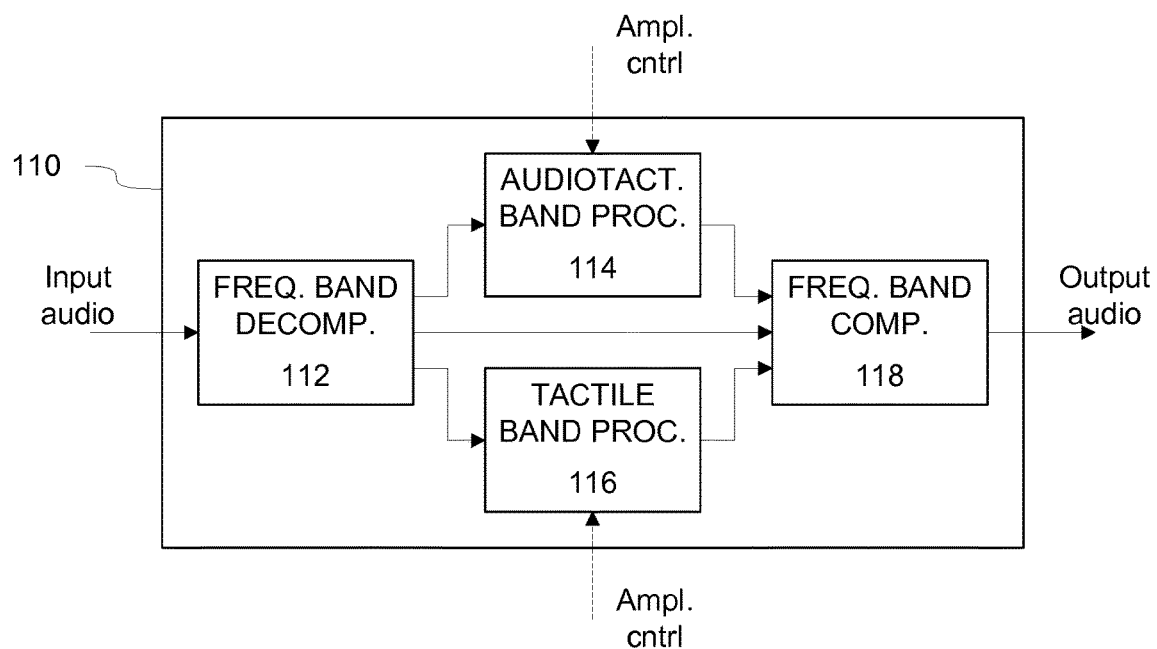
FIG. 1A depicts a block diagram of some logical components of a regulation means provided as an audio processing entity according to an example embodiment.

Various example embodiments of the present invention relate to (i) using a sound and vibration generating arrangement to jointly produce vibration and sound to reproduce an input audio signal provided as input thereto, where the sound and vibration generating arrangement is provided inside a padding to generate mechanical vibration that is perceivable as a vibration and sound on at least one outer surface of the padding and to radiate a sound through said at least one outer surface of the padding and (ii) using a regulation arrangement to regulate perceivable intensity of vibration in dependence of at least one characteristics of the input audio signal.

Regarding the aspect (i) in the foregoing, the apparatus or device applied in joint production of vibration and sound may be, for example, a cushion of the type described in the international patent application published as WO 2015/118217 A1, which is incorporated by reference in its entirety herein. This, however, serves a non-limiting example and embodiments of the present invention may be employed to jointly provide vibration and sound on and though an outer surface of a padded object of some other type.

Regarding the aspect (ii) in the foregoing, regulation of the perceivable intensity may be provided, for example, according to one of the following principles or by using a combination of the two:

The regulation arrangement may comprise an audio processing entity that modifies an input audio signal before providing it to the vibration arrangement. Hence, in this approach, the input audio signal is preprocessed to exhibit characteristics (e.g. with respect to its amplitude and/or frequency content) that result in desired regulation of the vibration characteristics provided by the sound and vibration generating arrangement that has a linear or substantially linear response to the audio signal provided as input thereto.

The regulation means may comprise a mechanical structure provided as part of the sound and vibration generating arrangement, which mechanical structure has characteristics that serve to provide a non-linear response to the audio signal provided as input thereto, e.g. such that amplitude of the generated vibration is emphasized or de-emphasized at least in one sub-range of frequencies.

The sound and vibration generating arrangement may be also referred to as means for jointly producing vibration and sound to reflect the fact that there is a plurality of ways to implement such an arrangement. In this regard, some non-limiting examples are provided later in this text. However, in the interest of editorial clarity of the description, in the following we predominantly refer to the sound and vibration generating arrangement (e.g. means for jointly producing vibration and sound) as sound reproduction means, while it may also be referred to as a sound reproduction assembly, as vibration means or as a vibration assembly. Along similar lines, the regulation arrangement is predominantly referred to in the following a regulation means, whereas it may also be referred to as a regulation assembly or as a regulation entity.

In the following, we first describe in detail an arrangement where the regulation of the perceivable intensity of vibration is carried out by modifying characteristics of the input audio signal in an audio processing entity before providing the audio signal for reproduction by the sound reproduction means, followed by a description of an arrangement where the regulation of the perceivable intensity of vibration is carried out via a mechanical structure of the sound reproduction that reacts to the audio input signal in a non-linear manner and that is driven using the input audio signal as such.

Throughout this text, references to the audio signal are made. While an audio signal may be considered to consist of frequencies that are audible in view of human hearing system, e.g. approximately from 50 Hz, to 20 kHz, herein the term audio signal is to be construed broadly, encompassing also infrasonic frequencies below the audible frequency range (e.g. down to 5 Hz) and/or ultrasonic frequencies above the audible frequency range (e.g. up to 30 kHz).

Parallel to hearing system through ears, extended definition of audio signal encompasses also effects to related senses that are affected by the acoustical excitation in the audio frequency range. Sense of touch reacts to vibration both on skin and inner tissues of the human body. In the audible frequencies, cutaneous receptors on skin capture information typically from 20 to 500 Hz. If the airborne sound transmitted by fluid (air or water) is intense enough, skin is vibrating and this vibrotactile perception supports the auditory perception. Synchronic information from the sense of touch and from hearing support each other, thereby increasing the clarity of the perceived audio information. At lower vibrotactile audio frequencies, say frequencies below 100 Hz, mechanical vibration is easily propagating also to body parts located below skin, and vibration receptors in joints and muscles react to the audio signal. Vibration is further affecting deeper body parts with very low audio frequencies and infrasonic frequencies. Typically frequencies below 30 Hz are not audible by a human listener, and signal components at such frequencies are primarily perceived as body vibration via mechanical contact to the environment. Infrasonic frequencies are typically related to energetic mechanical events like earthquakes or explosions that vibrate and deform structures and that can be perceived via feet. Skin can also sense infrasound frequencies as pressure sensation, or via various nonlinear mechanisms (e g clothes flapping towards skin).

Intense vibration may also affect or interfere with other senses: low frequency vibration on head may disturb visual perception and thereby have a detrimental effect to a balance sense. Eyes (visual system), ears (where the vestibular system is located) and the body's sense of where it is in space (proprioception) work together. Consequently, vibration stimulus may serve as an aid for human hearing, but the vibration stimulus is preferably regulated to avoid or at least limit multisensory interference and discomfort that may result from the vibration.

Regardless of the manner of providing the regulation means, the regulation means may be arranged to regulate the perceivable intensity of the vibration to be produced by the sound reproduction means in one or several ways. As a few examples in this regard, the regulating means may be arranged to regulate perceivable intensity of vibration as a function of frequency of the input audio signal and/or to regulate perceivable intensity of vibration as a function of magnitude of the input audio signal. In the following, we provide a few non-limiting examples in this regard. The mechanisms applied to regulate the vibration may serve to compress the dynamic range of the vibration provided by the sound reproduction means (in comparison to the dynamic range that would result in generating the vibration on basis of characteristics of the input audio signal in a linear manner).

As an example, the regulation means may be arranged to increase the magnitude of (to be) produced vibration at frequencies below a first predefined threshold (e.g. a first predefined frequency point). The first predefined threshold may be, for example, a threshold that denotes the upper limit for audiotactile frequencies that convey both the audible sound and vibration. As an example, the first predefined threshold may be set e.g. to 200 Hz, to 1000 Hz, or to a suitable value in the range from 200 to 1000 Hz, for example to 500 Hz. Such regulation of vibration serves to ensure sufficient intensity at audiotactile frequencies in order to convey vibration at an intensity that serves to invoke also the sense of touch for improved perception of sound.

As another example, additionally or alternatively, the regulation means may be arranged to decrease the magnitude of (to be) produced vibration at frequencies above a second predefined threshold (e.g. a second predefined frequency point). The second predefined threshold may be, for example, a threshold that denotes the lower limit of hearing. As an example the second threshold may be 50 Hz. As further examples, the second predefined threshold may be set e.g. to 30 Hz, to 80 Hz, or to a suitable value in the range from 30 to 100 Hz. Such regulation of vibration serves to ensure sufficient relative intensity at tactile or infrasonic frequencies in order to convey vibration at an intensity that serves to invoke the sense of touch to support perception of sound.

As a further example, additionally or alternatively, the regulation means may be arranged to decrease the magnitude of (to be) produced vibration in view of a predefined magnitude threshold. Such regulation may involve limiting the magnitude of vibration such that it does not exceed the predefined magnitude threshold or limiting the magnitude of vibration in response to observing vibration that exceeds the predefined magnitude threshold. Such regulation may be carried out across the whole frequency band or across one or more frequency sub-bands, e.g. a frequency sub-band that covers the audiotactile frequencies (i.e. frequencies that convey both audible sound and perceivable vibration) and/or a frequency sub-band that covers tactile frequencies (i.e. frequencies that are below an audible frequency range that convey perceivable vibration).

FIG. 1A depicts a block diagram of some (logical) components of the regulation means provided as an audio processing entity 110. The audio processing entity 110 comprises a frequency band decomposition entity 112, an audiotacticle band processing entity 114, a tactile band processing entity 116, and a frequency band composition entity 118. The audio processing entity 110 may comprise further (logical) components or sub-entities not described herein.

The frequency band decomposition entity 112 serves to decompose the input audio signal into two or more frequency sub-bands and provide at least two of these frequency bands for further processing by respective processing entities of the audio processing entity 110. As an example, the frequency band decomposition entity 112 may decompose the input audio signal into an audio band, an audiotactile band, and a tactile band. The frequency band decomposition entity 112 may be provided, for example, as a suitable analysis filter bank. As an example, the frequency band decomposition entity 112 may be arranged to provide the tactile band as a frequency sub-band that covers tactile frequencies approximately from 5 Hz to 50 Hz, to provide the audiotactile band as a frequency sub-band that covers frequencies approximately from 50 Hz to 1000 Hz and to provide the audio band as a frequency sub-band that covers audible frequencies approximately from 1000 Hz to 20 kHz.

The audiotactile band processing entity 114 serves to modify one or more characteristics of the signal in the audiotactile band. This may involve modification of the amplitude of the signal in the audiotactile band and/or frequency content of the signal in the audiotactile band. The modification carried out in the audiotactile band processing entity 114 may be carried out by using one or more digital filters. As an example in this regard, a digital filter may employ fixed predefined filtering characteristics. As another example, a digital filter may employ adaptable filter characteristics, where the filtering characteristics may be adaptable in dependence of at least one characteristics of the signal in the audio band and/or the input audio signal received at the audio processing entity 110.

The tactile band processing entity 116 may be arranged to modify the amplitude of the signal in the tactile band according to one or more predefined processing rules. In this regard, a processing rule may implement e.g. one of the examples of regulating the intensity of the (to be) produced vibration described in the foregoing:

A first processing rule may cause the tactile band processing entity 116 to increase the amplitude of the signal in the tactile band (thus, below a frequency point that serves as the upper threshold of the tactile frequencies) to ensure that sufficient tactile effect is provided to complement the directly audible signal component for enhanced perception of sound.

A second processing rule may cause the tactile band processing entity 116 to limit the amplitude of the signal in the tactile band in view of the predefined magnitude threshold to ensure that extent of tactile effect does not cause discomfort to the listener.

As an example, the tactile processing entity 116 may implement the first processing rule by multiplying the signal in the tactile band by a suitable gain factor (that has a value greater than unity), thereby increasing the vibration intensity in a similar manner across the tactile band. In another example, the tactile band processing entity 116 may implement the first processing rule by filtering the signal in the tactile band by using a (first) predefined digital filter, thereby enabling desired increase of the vibration intensity as a function of frequency across the tactile band.

Along similar lines the tactile band processing entity 116 may implement the second processing rule by multiplying the signal in the tactile band by a suitable gain factor (that has a value smaller than unity) such that the predefined magnitude threshold is not exceeded, thereby decreasing the vibration intensity in a similar manner across the tactile band.

The audio band may be provided directly from the frequency band decomposition entity 112 to the frequency band composition entity 118 to make it available therein together with the processed frequency sub-band signals from the audiotactile band processing entity 114 and the tactile band processing entity 116 for creation of a composite audio signal. The frequency band composition entity 118 serves to compose frequency sub-bands resulting from the decomposition in the frequency band decomposition entity 112 (e.g. the audio band, the audiotactile band, and the tactile band) into the composite audio signal for provision as the output audio signal to the sound reproduction means. The frequency band composition entity 118 may be provided, for example, as a suitable synthesis filter bank.

The output audio signal from the frequency band composition entity 118 serves as the output signal from the audio processing entity 110. The output audio signal is employed to drive the sound reproduction means to jointly produce vibration and sound accordingly. In an example, the output audio signal is provided to the sound reproduction means via an audio amplifier. The audio amplifier may apply and a fixed predetermined gain to the output audio signal or may receive a user input that control the gain applied therein. In another example, the output audio signal is provided to the sound reproduction means without additional amplification.

FIG. 1A further depicts respective optional control inputs to each of the audiotactile band processing entity 114 and the tactile band processing entity 116 that may be provided to enable level control if the signal processed by the respective processing entity 114, 116. The control inputs serve to enable provision of user commands that result in adjusting the signal level in the respective processing entity 114, 116, thereby enabling adjustment of perceivable intensity of vibration and/or sound at the respective frequency sub-band independently of the other frequency sub-bands. Such user control enables fine tuning the produced intensity of vibration and/or sound to match personal preferences of the listener.

Figure 1B:
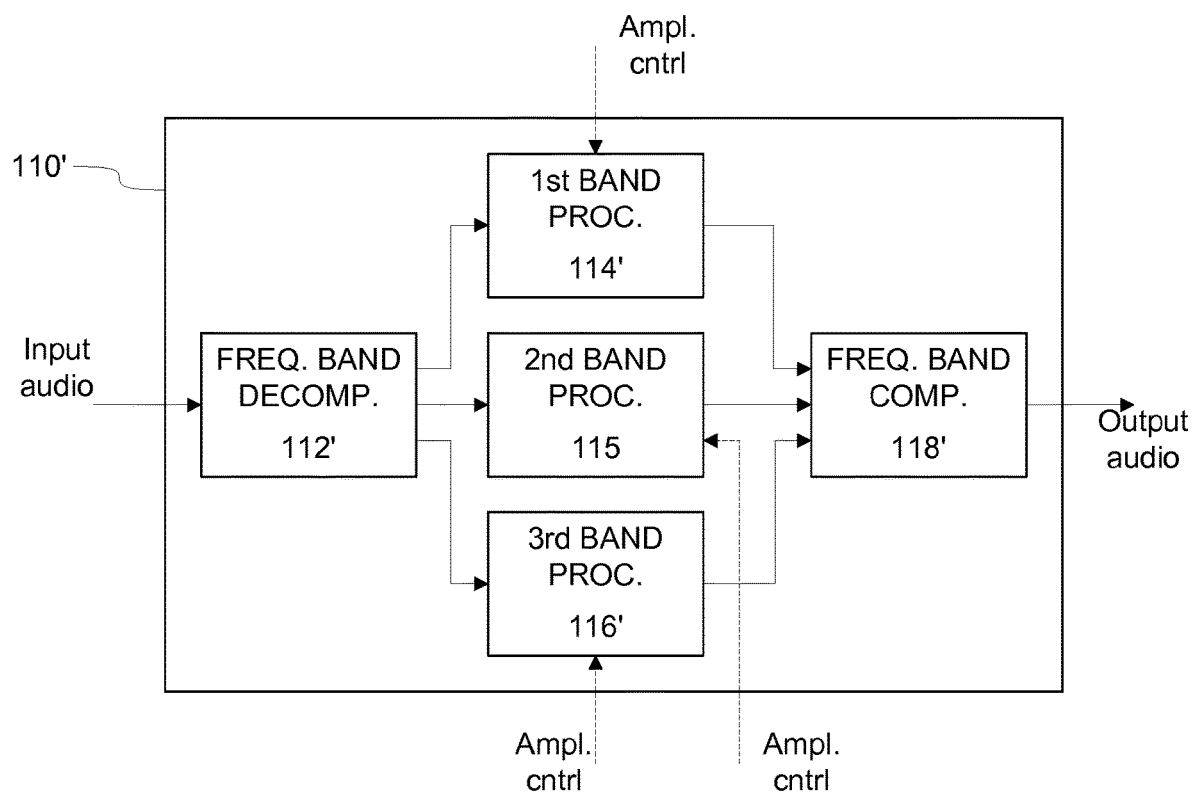
FIG. 1B depicts a block diagram of some logical components of a regulation means provided as an audio processing entity according to an example embodiment.

In the example of FIG. 1A, the input audio signal is decomposed (by the frequency band decomposition entity 112) into two or more frequency sub-bands, out of which at least two frequency sub-bands are provided for processing by the audiotactile band processing entity 114 and the tactile band processing entity 116, respectively. In other examples, more than two frequency sub-bands may be provided for further processing in respective processing entities. As an example in this regard, FIG. 1B depicts a block diagram of some (logical) components of an audio processing entity 110', which is a variation of the audio processing entity 110. The audio processing entity 110 comprises a frequency band decomposition entity 112', a first sub-band processing entity 114', a second sub-band processing entity 115, a third sub-band processing entity 116', and a frequency band composition entity 118'. The audio processing entity 110' may comprise further (logical) components or sub-entities not described herein. The difference to the audio processing entity 110 is that in the audio processing entity 110' each of the frequency sub-bands extracted from the input audio signal is provided for processing by the respective one of the first, second and third sub-band processing entities 114', 115, 116'. Respective output signals from the sub-band processing entities 114', 115, 116' and decomposed into composite audio signal by the frequency band composition entity 118', which composite audio signal serves as the output audio signal from the audio processing entity 110'.

Figure 2A:
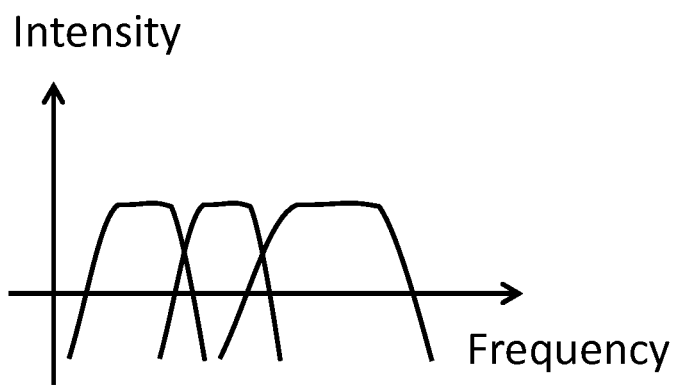
FIG. 2A schematically illustrates division of a frequency band into three frequency sub-bands.

As an example of using three frequency sub-bands, FIG. 2A schematically illustrates division of the frequency band into three frequency sub-bands, where each of the solid curves represents a respective frequency sub-band. The three frequency sub-bands may comprise a tactile band (e.g. an infra-sound band) from 5 to 50 Hz, the audiotactile band from 50 to 500 (or 1000) Hz, and an audio band from 500 (or 1000) to 20 kHz. In one example, the first sub-band processing entity 114' may process the audio band signal, the second sub-band processing entity 115 may process the audiotactile band signal, and the third sub-band processing entity 116' may process the tactile band signal.

Figure 2B:
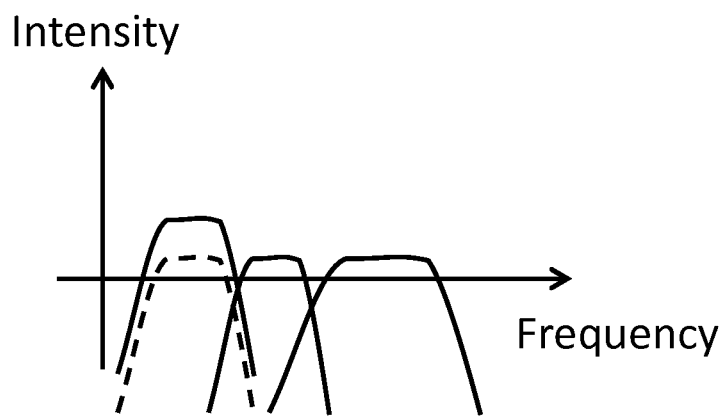
FIG. 2B schematically illustrates operation of a processing rule for processing a signal in a frequency according to an example embodiment.
Figure 2C:
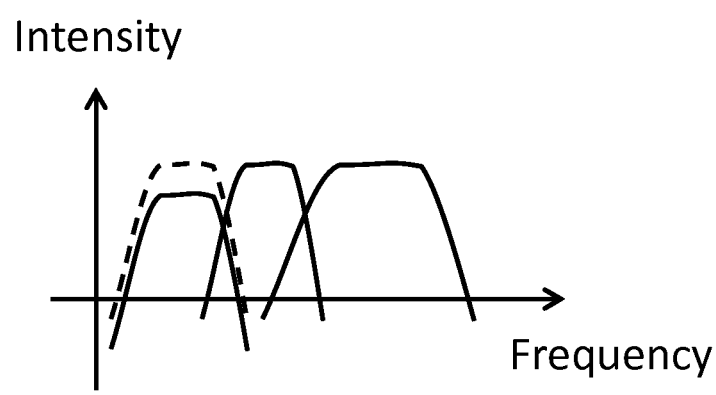
FIG. 2C schematically illustrates operation of a processing rule for processing a signal in a frequency according to an example embodiment.

FIGS. 2B and 2C further illustrate operation of a processing rule that may be applied in a processing entity that processes the lowermost frequency sub-band under consideration by the audio processing entity 110 (e.g. the tactile band described above). This processing entity may comprise e.g. the tactile band processing entity 116 of the audio processing entity 110 or the third sub-band processing entity 116' of the audio processing entity 110'. In FIG. 2B the dashed curve represents the infra-sound band as obtained from the frequency band decomposition entity 112, 112' and the solid curve at the substantially same position in the frequency axis represents the tactile band as provided to the frequency band composition entity 118, 118' for generation of the composite audio signal. Hence, FIG. 2B illustrates a scenario where the magnitude of the tactile band signal is increased in order to ensure sufficient tactile effect to complement the audible signal component for enhanced perception of sound, along the lines described in the foregoing for the first processing rule.

Along the lines of FIG. 2C, the dashed curve represents the tactile band as obtained from the frequency band decomposition entity 112, 112' and the solid curve at the substantially same position in the frequency axis represents the tactile band as provided to the frequency band composition entity 118, 118' for generation of the composite audio signal. Hence, FIG. 2C illustrates a scenario where the amplitude of the tactile band signal is limited in order to ensure avoiding discomfort to the listener due to excessive vibration intensity, along the lines described in the foregoing for the second processing rule.

Figure 3:
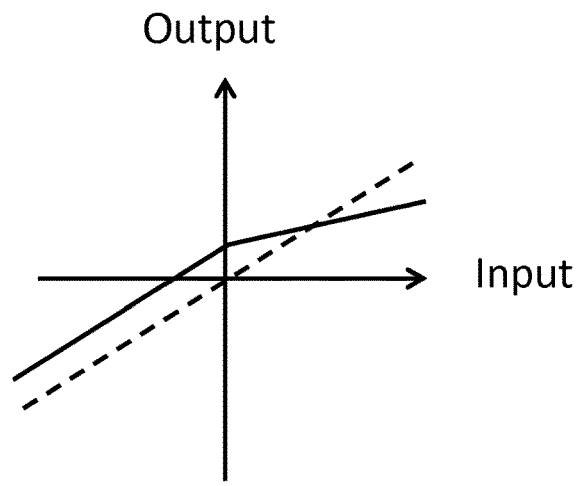
FIG. 3 illustrates a graph depicting operation of one or more processing rules for processing a signal in a frequency according to an example embodiment.

The combined effect resulting from operation of the first and second processing rules illustrated by the examples of FIGS. 2B and 2C is further characterized by the curve shown in FIG. 3. Therein, the relationship between the amplitude of the signal in the tactile band in the input and output of the processing entity that is arranged to process this frequency sub-band is illustrated: tactile band intensity (e.g. energy) is monitored with a level detector. Detection happens with proper time constants (attack time and release time). According to detected intensity, output gain is adjusted adaptively. At a low input intensity (e.g. at intensities that a below a first predefined intensity threshold), there is a gain applied in the frequency sub-band to increase the energy in the tactile band signal to make it more readily perceivable. Above a second predefined intensity threshold, the applied gain is reduced gradually. Resulting output signal from the processing entity that operates to process the tactile band signal is thus regulated so that the gain applied to its input signal becomes attenuated at high intensity values (e.g. at intensity values above the second predefined intensity threshold). Output intensity is thereby adjusted to have a better match with limits of the human perception.

Each of the audio processing entities 110, 110' may be provided by hardware means or by a combination of hardware means and software means. As an example for the latter, the audio processing entity 110, 110' may be jointly provided by an apparatus comprising a processor and a memory, which memory is arranged to store computer program code that comprises computer-executable instructions that, when executed by the processor, cause the apparatus to operate as the audio processing entity 110, 110' described by a number of examples in the foregoing.

Herein, reference(s) to a processor should not be understood to encompass only programmable processors, but also dedicated circuits such as field-programmable gate arrays (FPGA), application specific circuits (ASIC), signal processors, analog electrical circuits, etc.

The output audio signal from the audio processing entity 110 may be provided for joint generation of vibration by sound by the sound reproduction means that provides linear or substantially linear response to the output audio signal, i.e. vibration and sound whose relative amplitude across the frequency band of the output audio signal match or substantially match those of the output audio signal.

As an example in this regard, the sound reproduction means comprises at least one mechanical actuator and at least one board, wherein said at least one mechanical actuator is arranged to vibrate the at least one board in accordance with the output audio signal received from the audio processing entity 110. As an example, such a solution may be provided e.g. by mechanically connecting or suspending a moveable magnet to the at least one board and driving the movement of the moveable magnet by the output audio signal received from the audio processing entity 110. In a variation of this example, the moveable magnet may be a magnet assembly of a loudspeaker element, which loudspeaker element is mechanically connected to the at least one board.

In another example, the sound reproduction means comprises at least one mechanical actuator comprising at least one board that is vibratable, e.g. driven, in accordance with the output audio signal received from the audio processing entity 110. As an example, such a solution may be provided by the at least one board comprising a piezoelectric or magneto-strictive element that causes deformations of the at least one board in accordance with the output audio signal received from the audio processing entity 110.

As already briefly described in the foregoing, instead of (or in addition to) the audio processing entity 110, 110', the regulation means may be provided via a mechanical structure of the sound reproduction means. In this approach, mechanical vibration tuning and resonators may be applied in the sound reproduction means to provide the regulation means e.g. such that they are arranged have resonance amplification at low frequencies (e.g. below 50 Hz). The resonance frequency of the mechanical structure is determined as a ratio of effective mass of vibrating parts and stiffness of elastic suspension of the vibrating parts. Non-linear mechanical materials in the elastic suspension can be employed to provide a desired resonance frequency, thereby resulting in limitation of vibration amplitudes in respective frequency.

Figure 4:
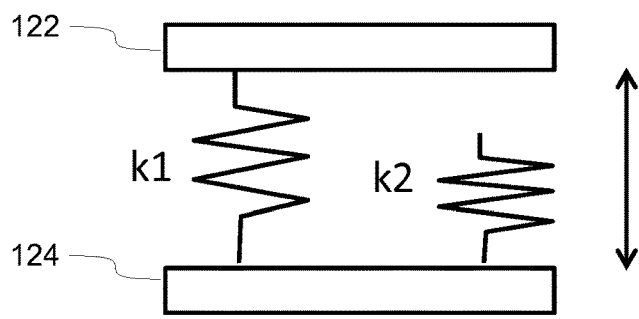
FIG. 4 schematically illustrates a mechanical structure for regulating vibration intensity according to an example embodiment.

As an example in this regard, a hardening spring can be implemented, which hardening spring has a low spring constant at small vibration amplitudes and larger effective spring constant at larger vibration amplitudes. Resulting behavior is that at moderate levels of vibration amplitudes the resonance amplification enhances the low frequencies in the produced vibration and sound, while at high vibration amplitudes the mechanical resonance amplification shifts to higher frequencies. An example of a mechanical structure for regulating the vibration intensity is depicted in FIG. 4: a moveable mass 122 that is elastically coupled to a board 124 via at least one first non-linear spring is driven by the input audio signal. Hence, the movement of the moveable mass 122 caused by the input audio signal is transferred to the board 124 via the first non-linear spring, whereas movement of the board 124 jointly generates the vibration and sound to reproduce the input audio signal. Herein, due to the movement induced therein via the mechanical connection/suspension to the moveable mass 122, also the board 124 constitutes a moveable mass. The structure of FIG. 4 further comprises at least one second non-linear spring that is attached to the board 124 from a first end and that protrudes from the board 124 but that does not extend to the moveable mass 122. In other words, there is a gap between a second end of the at least one second non-linear spring and the moveable mass 122. The at least one first non-linear spring has spring constant k1 and the at least one second non-linear spring has spring constant k2.

Figure 5:
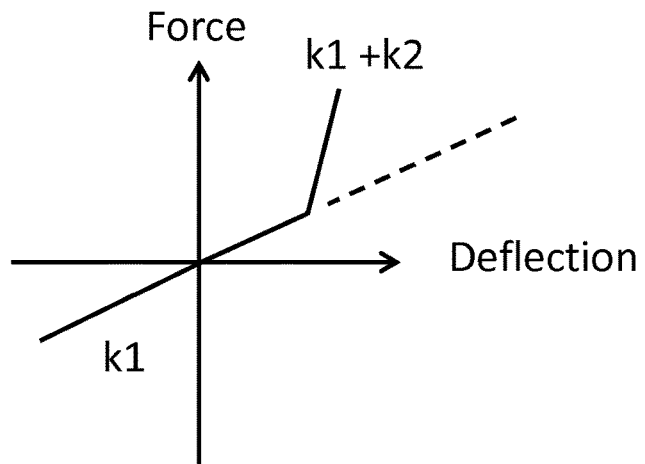
FIG. 5 illustrates a graph depicting operation of a mechanical structure for regulating vibration intensity according to an example embodiment.

The frequency-dependent regulation of the vibration intensity resulting from usage of the mechanical structure outlined in FIG. 4 is further illustrated by the graph shown in FIG. 5, which shows the combined elastic behavior (e.g. elastic restoring force vs. deflection) of the first and second springs arranged in parallel. At low amplitudes of relative deflection of the moveable mases 124 and 122 in FIG. 4, the first spring (having the spring constant k1) acts as an elastic element. At larger deflection amplitudes, part of deflection cycle exhibits also added stiffness of the second spring (having the spring constant k2), thus increasing the effective spring constant of the mechanical connection/suspension between the moveable mass 122 and the board 124. Thus, with large amplitude vibration, the resonance frequency of the spring—mass system formed by the first and second springs together with the moveable mass 122 and the board 124 is shifted upwards.

Another example of providing the regulation means as part of the mechanical structure of the sound reproduction means includes adaptation of the elastic properties of the structure by intentionally pre-tensioning one or more non-linear springs. This enables the user to adjust the resonance amplification e.g. by pressing a surface of or otherwise deforming the device or apparatus applied in joint production of vibration and sound as described herein. For example, if the device/apparatus is provided as a cushion, the user may press the device by his/her head, and this pressure may result in a change in the spring constant (e.g. k1 and k2 of the example of FIG. 4) and thus the effective resonance amplification by the mechanical structure applied as the regulation means.

The mechanical structure of the sound reproduction means, e.g. according to the example of FIG. 4, applied as the regulation means that involves non-linear dynamic behavior may creates some unwanted distortion in the produced sound. This, however, is typically not a serious limitation to the performance of the arrangement since human hearing is not sensitive to distortions at low frequencies. Typically, low frequency perception by human hearing happens through harmonic partials of the bass frequencies, and bass distortion products are typically perceived as a natural component of the sound instead of being perceived as audible disturbances by the user.

In the description in the foregoing, although some functions have been described with reference to certain features, those functions may be performable by other features whether described or not. Although features have been described with reference to certain embodiments or examples, those features may also be present in other embodiments or examples whether described or not.

The invention claimed is:

1. An apparatus for joint production of vibration and sound, the apparatus comprising:
a sound reproduction system configured to jointly produce vibration and sound and configured to reproduce an input audio signal provided as input thereto, said sound reproduction system comprising at least one mechanical actuator and at least one board disposed inside a padding, said at least one mechanical actuator being configured to vibrate said at least one board in accordance with the input audio signal to generate mechanical vibration that is perceivable as a vibration and sound on at least one outer surface of the padding and to radiate the sound through said at least one outer surface of the padding; and
a regulation assembly configured to regulate a perceivable intensity of vibration depending on at least one characteristic of the input audio signal, the regulation assembly configured to
increase a magnitude of the produced vibration below a first predefined frequency point, said increasing the magnitude comprising multiplying the input audio signal below the first predefined frequency point by a first scaling factor that has a value greater than unity, and
limit the perceivable intensity of the produced vibration in response to the magnitude of the produced vibration exceeding a predefined magnitude threshold, said limiting the perceivable intensity comprising multiplying the input audio signal below the first predefined frequency point by a second scaling factor that has a value smaller than unity such that the predefined magnitude threshold is not exceeded.

2. The apparatus according to claim 1, wherein the regulation assembly is configured to compress the dynamic range of the produced vibration.

3. The apparatus according to claim 1, wherein the regulation assembly is configured to reduce the magnitude of the produced vibration above a second predefined frequency point.

4. The apparatus according to claim 1, wherein the regulation assembly comprises a processor configured to modify said input audio signal before passing the input audio signal to the sound reproduction system.

5. The apparatus according to claim 4, wherein the regulation assembly is configured to modify said input audio signal by filtering the input audio signal using one or more digital filters of respective adaptive filtering characteristics, wherein each of the digital filters is adaptable depending on at least one characteristic of the input audio signal.

6. The apparatus according to claim 1, wherein the regulation assembly comprises a mechanical structure configured to regulate the perceivable intensity of vibration depending on the at least one characteristic of the input audio signal.

7. The apparatus according to claim 1, wherein the regulation assembly is configured to adjust the perceivable intensity of vibration and/or sound at two or more frequency bands independently of other frequency bands.

8. A method for joint production of vibration and sound, the method comprising:
   jointly producing vibration and sound to reproduce an input audio signal by using a vibration system comprising at least one mechanical actuator and at least one board disposed inside a padding, said at least one mechanical actuator being configured to vibrate said at least one board in accordance with the input audio signal to generate mechanical vibration that is perceivable as a vibration and sound on at least one outer surface of the padding and to radiate the sound through said at least one outer surface of the padding; and
   regulating a perceivable intensity of vibration depending on at least one characteristic of the input audio signal, said regulating comprising
      increasing a magnitude of the produced vibration below a first predefined frequency point, said increasing the magnitude comprising multiplying the input audio signal below the first predefined frequency point by a first scaling factor that has a value greater than unity, and
      limiting the perceivable intensity of the produced vibration in response to the magnitude of the produced vibration exceeding a predefined magnitude threshold, said limiting the perceivable intensity comprising multiplying the input audio signal below the first predefined frequency point by a second scaling factor that has a value smaller than unity such that the predefined magnitude threshold is not exceeded.

9. The apparatus according to claim 2, wherein the regulation assembly is configured to reduce the magnitude of the produced vibration above a second predefined frequency point.

10. The apparatus according to claim 2, wherein the regulation assembly comprises a processor configured to modify said input audio signal before passing the input audio signal to the sound reproduction system.

11. The apparatus according to claim 3, wherein the regulation assembly comprises a processor configured to modify said input audio signal before passing the input audio signal to the sound reproduction system.

12. The apparatus according to claim 2, wherein the regulation assembly comprises a mechanical structure configured to regulate the perceivable intensity of vibration depending on the at least one characteristic of the input audio signal.

13. The apparatus according to claim 3, wherein the regulation assembly comprises a mechanical structure configured to regulate the perceivable intensity of vibration depending on the at least one characteristic of the input audio signal.

14. The apparatus according to claim 2, wherein the regulation assembly is configured to adjust the perceivable intensity of vibration and/or sound at two or more frequency bands independently of other frequency bands.

15. The apparatus according to claim 3, wherein the regulation assembly is configured to adjust the perceivable intensity of vibration and/or sound at two or more frequency bands independently of other frequency bands.

16. The apparatus according to claim 4, wherein regulation assembly is configured to adjust the perceivable intensity of vibration and/or sound at two or more frequency bands independently of other frequency bands.

17. The apparatus according to claim 5, wherein the regulation assembly is configured to adjust the perceivable intensity of vibration and/or sound at two or more frequency bands independently of other frequency bands.

18. The apparatus according to claim 6, wherein the regulation assembly is configured to adjust the perceivable intensity of vibration and/or sound at two or more frequency bands independently of other frequency bands.

19. The apparatus according to claim 9, wherein regulation assembly is configured to adjust perceivable intensity of vibration and/or sound at two or more frequency bands independently of other frequency bands.

20. The apparatus according to claim 10, wherein the regulation assembly is configured to adjust the perceivable intensity of vibration and/or sound at two or more frequency bands independently of other frequency bands.

* * * * *